(12) United States Patent
Tomar

(10) Patent No.: US 7,966,604 B2
(45) Date of Patent: Jun. 21, 2011

(54) WEB BROWSER OBJECT BASED AUTOMATIC TESTING METHOD FOR WEB APPLICATIONS

(75) Inventor: Abhay Tomar, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1346 days.

(21) Appl. No.: 11/504,417

(22) Filed: Aug. 14, 2006

(65) Prior Publication Data

US 2008/0127092 A1  May 29, 2008

(51) Int. Cl.
*G06F 9/44* (2006.01)
*G06F 9/45* (2006.01)

(52) U.S. Cl. .................. 717/127; 717/116; 717/130

(58) Field of Classification Search .......... 717/124–133, 717/116
See application file for complete search history.

(56) References Cited

U.S. PATENT DOCUMENTS

| | | | | |
|---|---|---|---|---|
| 6,081,665 A * | 6/2000 | Nilsen et al. | ................ | 717/116 |
| 6,185,701 B1 * | 2/2001 | Marullo et al. | ................ | 714/38 |
| 6,907,546 B1 * | 6/2005 | Haswell et al. | ................ | 714/38 |
| 7,171,588 B2 * | 1/2007 | Friedman et al. | ............. | 714/38 |
| 7,231,636 B1 * | 6/2007 | Evans | ......................... | 717/127 |
| 7,243,352 B2 * | 7/2007 | Mandava et al. | ............. | 718/104 |
| 7,266,808 B2 * | 9/2007 | Kolawa et al. | ................ | 717/126 |
| 7,334,220 B2 * | 2/2008 | Chang et al. | ................. | 717/126 |
| 7,392,506 B2 * | 6/2008 | Garcowski et al. | ........... | 717/107 |
| 7,451,434 B1 * | 11/2008 | Blumenthal et al. | .......... | 717/116 |
| 7,490,319 B2 * | 2/2009 | Blackwell et al. | ............. | 717/124 |
| 7,519,958 B2 * | 4/2009 | Griep | ............................. | 717/127 |
| 7,552,424 B1 * | 6/2009 | Bischof et al. | ................. | 717/127 |
| 7,574,698 B2 * | 8/2009 | Kumar et al. | ................. | 717/130 |
| 7,624,380 B2 * | 11/2009 | Okada | ........................... | 717/125 |
| 7,665,068 B2 * | 2/2010 | Neumann et al. | ............. | 717/125 |
| 7,698,688 B2 * | 4/2010 | Fujiwara et al. | .............. | 717/126 |
| 7,770,152 B1 * | 8/2010 | Kamen et al. | ................. | 717/127 |
| 7,877,733 B2 * | 1/2011 | Parkinson et al. | ............. | 717/127 |
| 2004/0226001 A1 | 11/2004 | Teegan et al. | | |

OTHER PUBLICATIONS

Hao et al, "Usage based statistical tetsing of web applications", ACM ICWE, pp. 17-24, 2006.*
Mesbah et al, "Invariant based automatic tetsing of Ajax user interface", IEEE ICSE, pp. 210-220, 2009.*
Halfond et al, "Precise interface identification to improve testing and analysis of web applications", ACM ISSTA, pp. 285-295, 2009.*
Xu et al, "Testing web applications focusing on their specialties", ACM SIGSOFT, vol. 30, No. 1, pp. 1-6, 2005.*
"Winrunner Rational Robot Visual Test QA Center Test Complete Rational Functional Tester", Copyright 1999-2007, total of 7 pp.

* cited by examiner

*Primary Examiner* — Anil Khatri
(74) *Attorney, Agent, or Firm* — Schiff Hardin LLP

(57) ABSTRACT

An object based automatic testing method can be used to test web-based applications. An executable portion of the web-based application is located, an object corresponding to the executable portion and stored in a library of objects in a computer readable memory is called, the object is executed to test the executable portion, and a determination is made as to whether the executable portion performed according to specification. No mouse or keyboard action is required execute this testing method.

20 Claims, 3 Drawing Sheets

WEB BROWSER OBJECT BASED AUTOMATIC TESTING METHOD FOR WEB APPLICATIONS

TECHNICAL FIELD

The technical field of this application relates to an automatic testing tool for testing an application whose execution is supported by a web browser.

BACKGROUND

Web-based applications typically use a web browser to support their execution. Many web-based applications use, for example, Internet Explorer to support their execution. These web-based applications are required to be tested against their specified functionalities in order to verify that they will execute as intended. For large web-based applications that have many lines of code, automated testing is preferable because automated testing can save substantial labor as compared to manual testing.

To automate the testing of web-based applications, an automated testing tool can be written using the COTS (commercial off the shelf) tools that are available in the market. Some examples of available COTS tools are Rational Robot, Rational functional tester from IBM-Rational™, Win Runner, QTP from Mercury Interactive, QA Center from Compuware, etc.

However, there are several problems in using existing COTS tools. For example, licenses to these COTS tools are not readily available as a practical matter, the cost of securing a license is very high, support for third party controls that are written to increase the functionality of web applications are not available to any practical extent in the existing COTS tools, deployment of such controls requires a separate license and patch to run the corresponding scripts, remote execution of these scripts also requires a separate license, maintenance of these scripts is poor, a propriety scripting language cannot be used across the tools, user interface related functions are not available, and a dedicated machine is required to run the scripts.

Moreover, existing COTS tools have only a limited set of operations that can be performed for the testing of web-based applications, which makes practical automation of application testing more difficult to achieve. Therefore, in order to increase the testing capability with available COTS tools, proxies (external DLL's) could be written in order to implement operations not supported by the COTS tools. A DLL is a dynamic link library of functions that can be called by a program when the program is run, rather than being linked to it when it is compiled. A DLL file is denoted with a .dll file extension.

These proxy functions could be called through existing COTS tools in order to perform the proxy operation and, in many cases, a user would have to write a great many proxies in order to achieve the required operations. Unfortunately, reliance on the COTS tool to call these proxies functions would mean that the problems associated with using existing COTS tools discussed above would not be avoided, and would be particularly troublesome in those applications requiring a testing tool that relies on many proxies.

Furthermore, because dedicated machines are required to run a test script supported by a COTS tool, the dedicated machine typically cannot perform any parallel processing while scripts are running since execution of the test script takes the control of mouse and the keyword, which prevents any interaction between the user and the dedicated machine.

The invention as claimed below overcomes one or more of these or other problems. In one embodiment, the machine executing test script is able to perform parallel activities even while the test script is executing on that machine.

SUMMARY OF THE INVENTION

In accordance with one aspect of the present invention, an object based automatic testing method is provided to test a web-based application. The method is executed on a computer, and the method comprises the following: locating an executable portion of the web-based application; calling an object corresponding to the executable portion, wherein the object is stored in a library of objects in a computer readable memory; executing the object to test the executable portion; and, determining if the executable portion performed according to specification, wherein execution of the method requires no mouse or keyboard action.

In accordance with another aspect of the present invention, an object based automatic testing method is provided to test a web-based application. The method is executed on a computer, and the method comprises the following: a) locating an executable portion of the web-based application; b) calling an object corresponding to the executable portion, wherein the object is stored in a library of objects in a computer readable memory; c) executing the object to test the executable portion; d) determining if the executable portion performed according to a specification; and, e) repeating a) through d) for all other executable portions of the web-based application.

BRIEF DESCRIPTION OF THE DRAWINGS

These and other features and advantages will become more apparent from the detailed description when taken in conjunction with the drawings in which.

DETAILED DESCRIPTION

Figure 1:
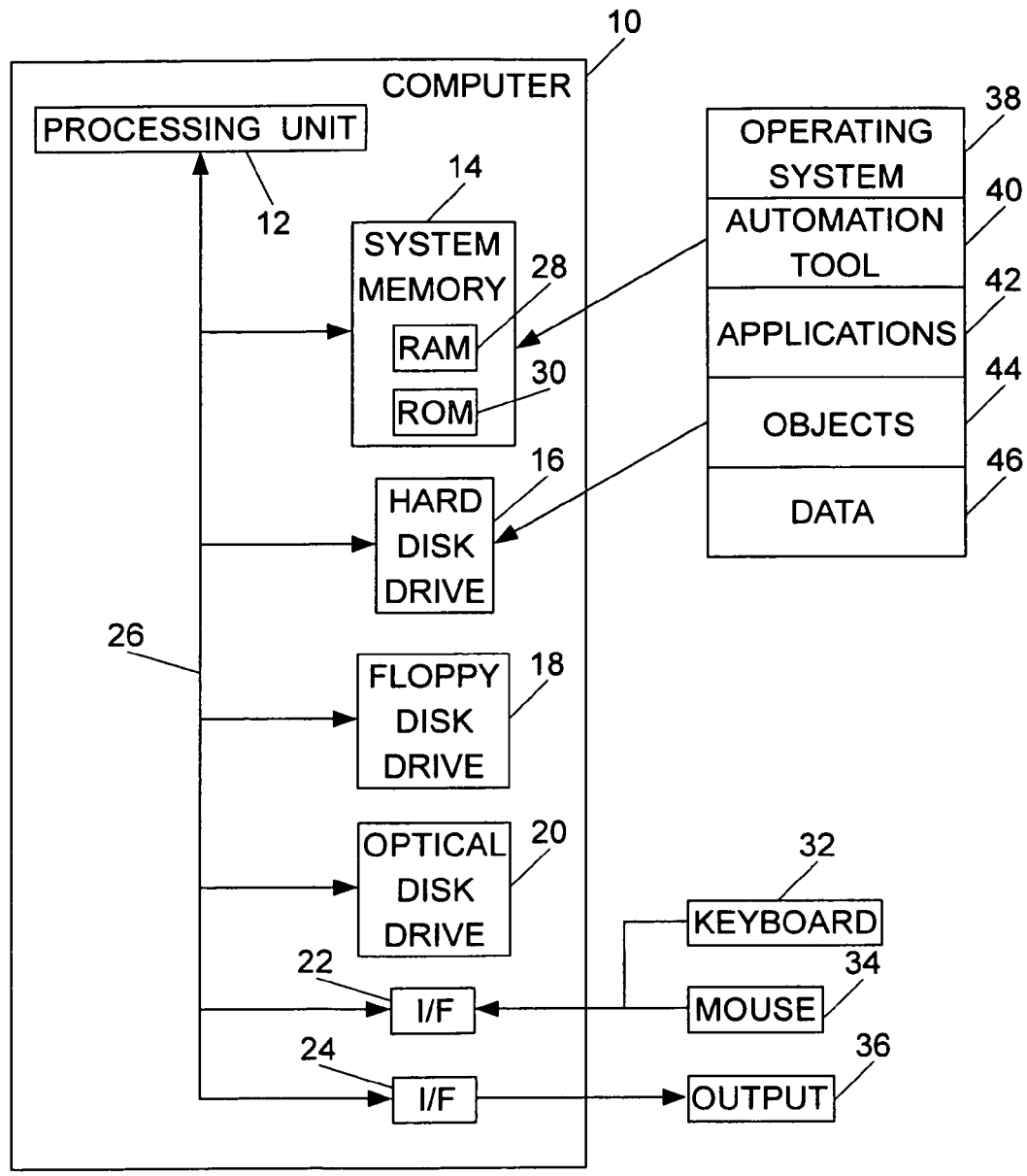
FIG. 1 is a block diagram of a computer system that may be used to implement certain functions as described below.

As shown in FIG. 1, a computer 10 has a processing unit 12, a system memory 14, a hard disk drive 16, a floppy disk drive 18, an optical disk drive 20, and interfaces 22 and 24, all coupled to a system bus 26. The computer 10 can have additional or alternative components.

The system memory 14 includes a random access memory (RAM) 28 and a read only memory (ROM) 30. A keyboard 32 and a mouse 34 are coupled to the system bus 26 by way of the interface 22, and an output device 36 is coupled to the system bus 26 by way of the interface 24. The output device 36 can be a printer, and/or a display, and/or other devices that provide output to a user of the computer 10.

The optical disk drive 20 can be any type of device to read from and/or write to an optical media. The hard disk drive 16, the floppy disk drive 18, and the optical disk drive 20 provide nonvolatile storage of data, data structures, computer-executable instructions, etc. for the computer 10. Although the computer 10 is shown to include the hard disk drive 16, the floppy disk drive 18, and the optical disk drive 20, it should be appreciated that other types of media which are readable by the computer 10, such as magnetic cassettes, flash memory cards, digital video disks, Bernoulli cartridges, and the like, may be used in the example operating environment.

A number of programs may be stored in the system memory 14 and/or the various drives 16, 18, and 20. These programs can include, for example, an operating system 38, an automation tool 40, one or more application programs 42, and objects 44 that can be called by the automatic tool 40. In addition, data 46 may be stored in the system memory 14 and/or the various drives 16, 18, and 20. The operating system 38, for example, may be an appropriate one of the MICROSOFT operating systems.

The user may enter commands and information into the computer 10 through the keyboard 32 and the mouse 34. Additional or alternative input devices could include a microphone, a joystick, a game pad, a satellite dish, a scanner, and/or the like.

The automation tool 40 according to one example uses an object based approach to automation, resulting in better reliability and maintainability as compared to the event based approach used by existing COTS tools. As is known, a software object is a self-contained computing entity which typically has its own data and its own associated operations or functions called methods.

The object based automation tool 40 includes a core engine which contains functions related to HTML controls. The core engine can create objects of any control available on the HTML page, and can record user actions in the form of functions. This activity is performed in the background, when the user is recording/testing any browser supported application such as a HTML page.

The object based automation tool 40 generates an output file such as in a visual basic scripting file format. The advantage of deploying a visual basic scripting file is that such a file can run on a standard Microsoft™ operating system and does not require any software installment in a dedicated testing machine to run the scripts. The output script file may use the Windows™ Scripting Host engine to run. Also, the object based automation tool 40 records all actions on the HTML controls in the form of function calls, which avoids any dependency on the keyboard 32 and the mouse 34 for operation.

Execution of the object based automation tool 40 may be supported by any web-browser that can run on a Windows™ operating system. One embodiment of the object based automation tool 40 described herein may be arranged to execute using Internet Explorer.

The object based automated tool 40 can be arranged to take advantage of the Document Object Model to automate the testing of web-based applications and to rely on Internet Explorer SPY in order to acquire the necessary information about the controls that are embedded in the application being tested. SPY is an available plug in for Internet Explorer that, when activated, reveals the source code of control elements such as those used in an HTML web page. This information includes, for example, the name or index associated with the control and its hierarchical information.

The object based automation tool 40 may be arranged to also contain an editor allowing the user to write his or her own test scripts for testing the web-based applications, using Visual Basis Scripting, for example, to compile and run the scripts. VBScript (which is the short form of Microsoft Visual Basic Scripting Edition) is a subset of Visual Basic that is used in Active Server Pages and in Windows™ Scripting Host as a general-purpose scripting language. Moreover, the object based automation tool 40 uses the DLL written for all the controls available with Internet Explorer. For each control, a set of functions is written to automate the control, and all of these functions are available to the user in the IDE of the tool. An IDE (Integrated Development Environment) allows the user to develop scripts using all resources given by the tool.

Moreover, the object based automation tool 40 avoids taking control of the keyboard 32 and the mouse 34. Therefore, the user is free to use the computer 10 on which the scripts of the object based automated tool 40 are executing to perform parallel activities. The object based automation tool 40 may be arranged to also include table related functions, such as get table cell data, total rows, etc., which are not directly provided by currently available COTS tools.

Apart from table related functions, the object based automation tool 40 may be arranged to contain functions related to control positions and their dimensions, which also are not directly provided by currently available COTS tools. Furthermore, the object based automation tool 40 may be arranged to contain a wizard utility to generate function code statements where the user keys in minimum value and other parameters that will be filled automatically by the wizard, thus saving a lot of scripting time. For example, the wizard setTextBoxValue will allow a user to key a value into edit box and other information will be filled automatically.

Each interaction between the HTML control of the application being tested and the object based automation tool 40 happens in the form of an object function call. For example, to click a button in the HTML page, the object based automation tool 40 calls an object function ClickButton to click the button in order to test the application function associated with that button. The operating system does not execute this function using the keyboard 32 or the mouse 34 so that the user can perform a parallel activity as desired.

By contrast, in existing COTS tools, each interaction occurs in the form of an event such as WM_BUTTON down and WM_BUTTON up. The operating system executes this interaction using the mouse 34 to perform the task. When the operating system uses the mouse 34 to generate the Mouse Event, the user cannot perform any other operation using the mouse 34 and, therefore, no other parallel activity can be performed.

In performing its operations using object calls, the object based automation tool 40 creates the object in the form of a hierarchy. For example, the object based automation tool 40 creates an object of a Webpage from the web page object. It then creates a child object of a particular type of control. Then, on that child object, it calls the appropriate function. During this period, the keyboard 32 and the mouse 34 are free, and the user can perform other parallel activities while the appropriate scripts are running on the computer 10 in the background.

Figure 2:
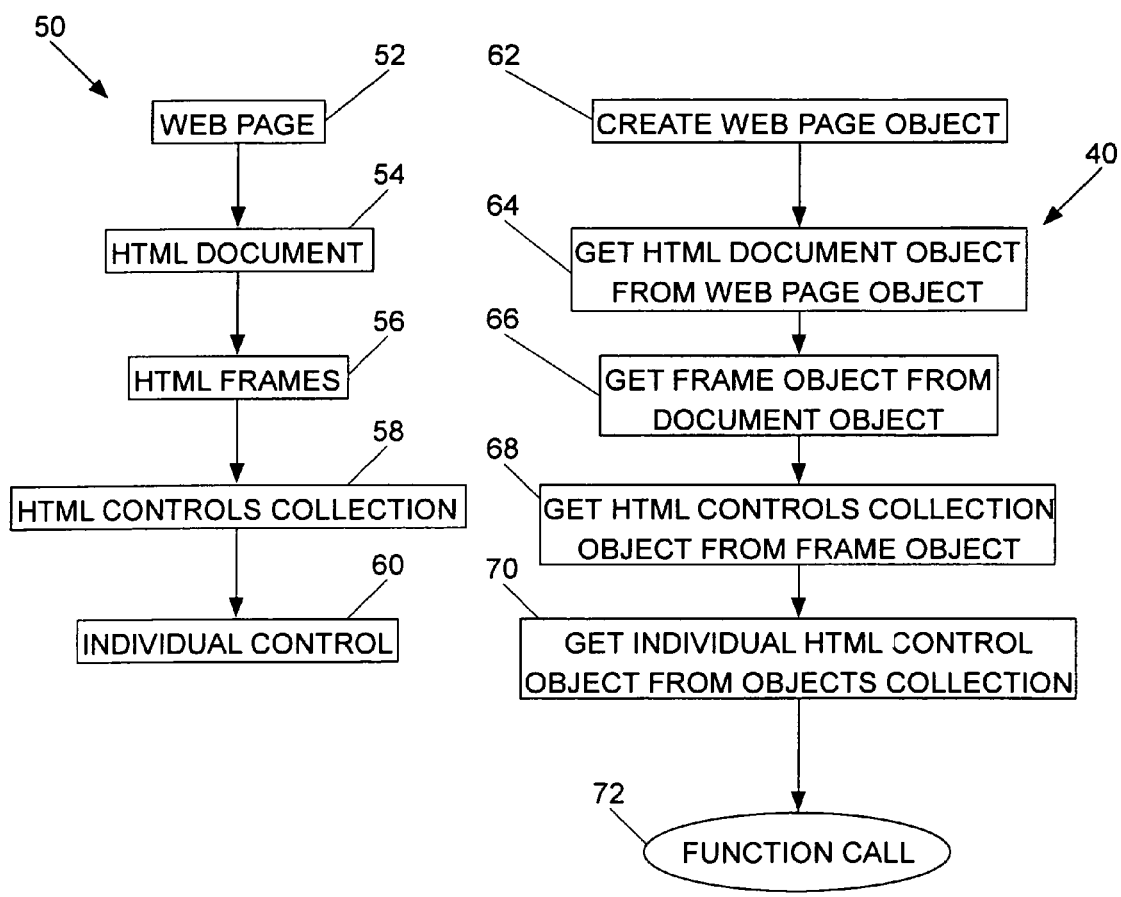
FIG. 2 illustrates the creation of an object in the form of a hierarchy and then calling a function based on this hierarchy; and, FIG. 3 illustrates an example of a core engine of the automation tool described in detail below.

FIG. 2 illustrates this approach of creating an object in the form of a hierarchy and then calling a function based on this hierarchy. The Web page as viewed by the object based automation tool 40 is on the left side of FIG. 2, and execution of the object based automation tool 40 is on the right side of FIG. 2.

Accordingly, a web page hierarchy 50 is exemplified by a web page 52 that comprises an HTML document 54 which is typically composed of a plurality of HTML frames 56. Each of the HTML frames 56 is composed of a collection 58 of HTML controls, and the collection 58 of controls includes an individual control 60.

The object based automation tool 40 at 62 uses Internet Explorer to create an object for the web page 52. As an example, to create a Google™ page object rendered on Internet Explorer, the following steps would be followed:

Enumerate all opened web pages until Google.com is found using Windows™ Shell API
Set sha=CreateObject("Shell.Application")
For Each sh In sha.Windows
//look for the desired page
Next
Set IEPageObject=sh
Set ObjDocument=sh.Document//Page object After creating the object for the web page 52, the object based automation tool 40 gets the HTML document object from the web page object at 64, gets the frame object from the HTML document object at 66, gets the collection object corresponding to the collection of HTML controls from the frame object at 68, gets the individual control object from the collections object at 70, and then calls the function from the objects 44 to test the individual control at 72. Because the object based automation tool 40 uses object calls to test the controls of the web page 50, the input devices of the computer 10, such as the keyboard 32 and the mouse 34, are not used during this testing, which means that the user is able to execute parallel processes using the computer 10.

An example of the script that can be used by the object based automation tool 40 for the function call at 72 to test the login button of a web page may be given in connection with the following "login to the web page" scenario: 1) Set User-Name in User Edit Box; 2) Set Password in Password Edit Box; and, 3) Click Login Button. The script, using VBScript, for part 1) of this scenario is as follows:

```
Dim objDocument as Object
Dim objElements as Object
Dim objEditBox as Object
Set objDocument=CreateObject("InternetExplorer.Application")
Set objElements=GetElementsByTagName("Input")
For Each objEditbox in objElements
    If objEditBox.Name="UserName" then
        objEditBox.Value="User1"
    End if
Next
```

The Dim (dimension) statement in this script is used to define the variables that are used in the Set statements and the If . . . Then statements. Accordingly, this script sets a user name in the user edit box of the web page.

The script for part 2) of this scenario is as follows:

```
Dim objDocument as Object
Dim objElements as Object
Dim objEditBox as Object
Set objDocument=CreateObject("InternetExplorer.Application")
Set objElements=GetElementsByTagName("Input")
For Each objEditbox in objElements
    If objEditBox.Name="Password" then
        objEditBox.Value="Pass"
    End if
Next
```

Accordingly, this script sets a password in the password edit box of the web page.

The script for part 3) of this scenario is as follows:

```
Dim objDocument as Object
Dim objElements as Object
Dim objButton as Object
```

-continued

```
Set objDocument=CreateObject("InternetExplorer.Application")
Set objElements=GetElementsByTagName("Button")
For Each objButton in objElements
    If objButton.Name="Login" then
        objButton.Click
    End if
Next
```

Accordingly, the statement objButtom.Click in this script calls the object function that will click the login button so that the object based automation tool 40 can test the operation of the login button.

Figure 3:
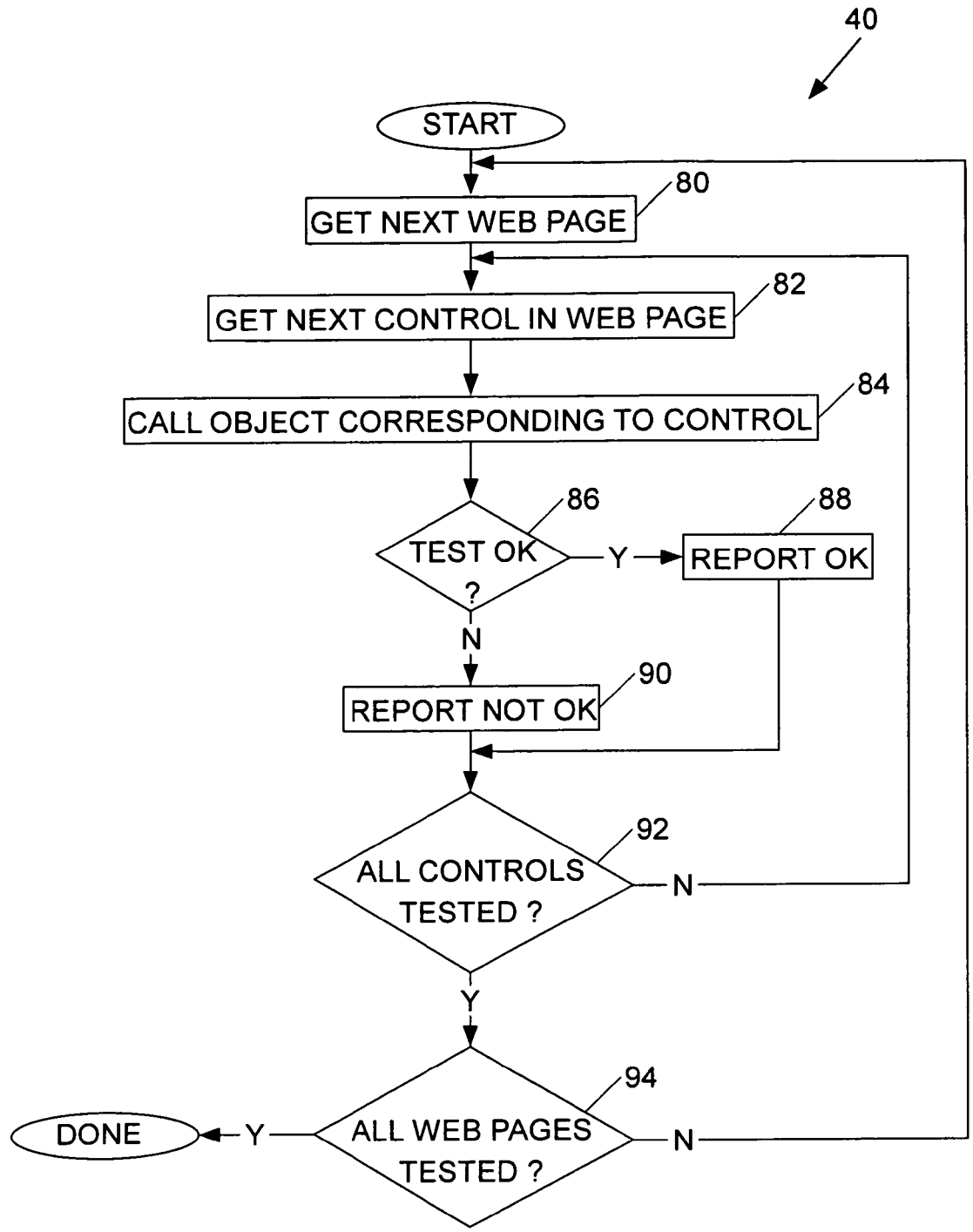

FIG. 3 shows an example of the core engine of the object based automation tool 40 in the form of a flow chart. When the object based automation tool 40 starts execution, the object based automation tool 40 at 80 gets the first web page to be tested and then at 82 gets the first control in the first web page to be tested. The object based automation tool 40 then, at 84, calls and executes the object that corresponds to this control. This object is among the objects 44 stored in the memory of the computer 10. As indicated above, this object may be written in VBScript. For example, if the first control is a login button, the script given in connection with the above login scenario may be used to call and execute this object.

The object based automation tool 40 observes activation of the control and if the control performs according to specification as determined at 86, the object based automation tool 40 reports at 88 that the control tested according to specification. However, if the control did not perform according to specification, the object based automation tool 40 reports at 90 that the control did not test according to specification.

After reporting at 88 or 90, the object based automation tool 40 determines at 92 whether all controls of the first web page have been tested. If not, flow returns to 82 to get the next control of the first web page. If all controls of the first web page have been tested, then the object based automation tool 40 determines at 94 whether all web pages have been tested. If not, flow returns to 80 to get the next web page. If all web pages have been tested, then the object based automation tool 40 is done.

The architecture of the core engine of the object based automation tool 40 is shown in FIG. 2.

The object based automation tool 40 can be used to test many functions embedded in web pages. For example, functions related to Links, Images, Tables, Combo Box, List Box, Buttons, Edit Box, etc., can be tested. As an example of testing a particular link abcxyz, the following script related to testing a link is as follows:

```
Dim objDocument as Object
Dim objElements as Object
Dim objLink as Object
Set objDocument=CreateObject("InternetExplorer.Application")
Set objElements=GetElementsByTagName("A")
For Each objLink in objElements
    If objLink.innerText= "linkabcxys"
        then objLink.Click
    End if
Next
```

As an example of testing a particular image signout, the following script related to testing an image is as follows:

```
Dim objDocument as Object
Dim objElements as Object
Dim objImage as Object
Set objDocument=CreateObject("InternetExplorer.Application")
Set objElements=GetElementsByTagName("IMG")
For Each objImage in objElements
    If objImage.name="SignOut" then
        objImage.Click
    End if
Next
```

Certain modifications have been discussed above. Other modifications will occur to those practicing in the related art. Accordingly, the description contained herein is to be construed as illustrative only and is for the purpose of teaching those skilled in the art the best mode of carrying out the invention as recited below. The details may be varied substantially without departing from the spirit of the invention, and the exclusive use of all modifications which are within the scope of the appended claims is reserved.

What is claimed is:

1. An object based automatic testing method for testing a web-based application, the method being executed on a computer, the method comprising:
   computer locating an executable portion of the web-based application;
   computer calling an object corresponding to the executable portion, wherein the object is stored in a library of objects in a computer readable memory;
   computer executing the object to test the executable portion;
   computer determining if the executable portion performed according to specification, wherein execution of the method requires no mouse or keyboard action; and,
   reporting whether or not the executable portion performed according to specification, wherein the web-based application comprises a web page, and wherein the executable portion comprises a control of the web page.

2. The method of claim 1 wherein the called object comprises an object function ClickButton whose execution avoids any mouse action.

3. The method of claim 1 wherein the object based automation tool comprises a script editor allowing the user to write test scripts for the object based automation tool.

4. The method of claim 1 wherein execution of the object based automation tool is supportable by a web browser.

5. The method of claim 1 wherein the calling of an object corresponding to the executable portion comprises calling an object written in VBS script.

6. The method of claim 5 wherein the calling of an object written in VBS script comprises calling an object written in VBS script having the following format:

```
Dim objDocument as object
Dim objElements as Object
Dim objα as Object
Set objDocument=CreateObject("InternetExplorer.Application")
Set objElements=GetElementsByTagName("β")
For Each objα in objElements
    If objα.name="γ" then
        objImage.Click
    End if
Next
``` wherein $\alpha$ is a type of a web page function, wherein $\beta$ is a tag name given to the web page function, and wherein $\gamma$ is the particular name given to the function of type $\alpha$ in the web page.

7. The method of claim 1 wherein the locating of an executable portion of the web-based application comprises locating a link function in a web page.

8. The method of claim 1 wherein the locating of an executable portion of the web-based application comprises locating an image function in a web page.

9. The method of claim 1 wherein the locating of an executable portion of the web-based application comprises locating a table function in a web page.

10. The method of claim 1 wherein the locating of an executable portion of the web-based application comprises locating an edit box function in a web page.

11. An object based automatic testing method for testing a web-based application, the method being executed on a computer, the method comprising:
   a) computer locating an executable portion of the web-based application;
   b) computer calling an object corresponding to the executable portion, wherein the object is stored in a library of objects in a computer readable memory;
   c) computer executing the object to test the executable portion;
   d) computer determining if the executable portion performed according to a specification;
   e) computer repeating a) through d) for all other executable portions of the web-based application; and,
   f) reporting whether or not the executable portion performed according to specification, wherein the web-based application comprises a web page, and wherein the executable portion comprises a control of the web page.

12. The method of claim 11 wherein the called object comprises an object function ClickButton whose execution avoids any mouse action.

13. The method of claim 11 wherein the object based automation tool comprises a script editor allowing the user to write test scripts for the object based automation tool.

14. The method of claim 11 wherein execution of the object based automation tool is supportable by a web browser.

15. The method of claim 11 wherein the calling of an object corresponding to the executable portion comprises calling an object written in VBS script.

16. The method of claim 15 wherein the calling of an object written in VBS script comprises calling an object written in VBS script having the following format:

```
Dim objDocument as object
Dim objElements as Object
Dim objα as Object
Set objDocument=CreateObject("InternetExplorer.Application")
Set objElements=GetElementsByTagName("β")
For Each objα in objElements
    If objα.name="γ" then
        objImage.Click
    End if
Next
``` wherein α is a type of a web page function, wherein β is a tag name given to the web page function, and wherein γ is the particular name given to the function of type α in the web page.

17. The method of claim 11 wherein the locating of an executable portion of the web-based application comprises locating a link function in a web page.

18. The method of claim 11 wherein the locating of an executable portion of the web-based application comprises locating an image function in a web page.

19. The method of claim 11 wherein the locating of an executable portion of the web-based application comprises locating a table function in a web page.

20. The method of claim 11 wherein the locating of an executable portion of the web-based application comprises locating an edit box function in a web page.

* * * * *